Sept. 20, 1955   L. A. BETZ   2,718,540
BATTERY AND CABLE CARRIER
Filed July 22, 1952   2 Sheets-Sheet 1
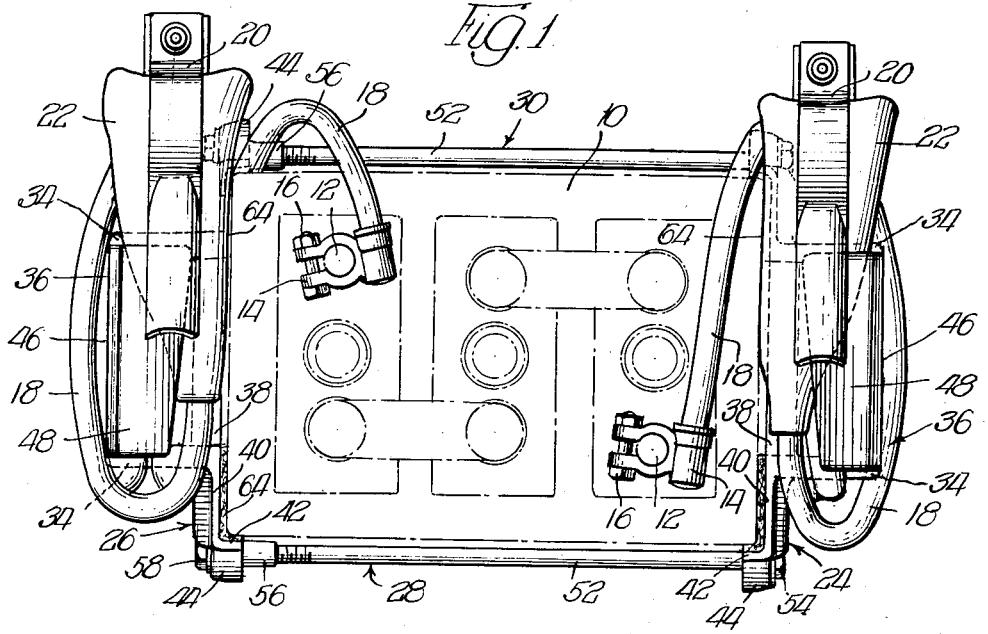
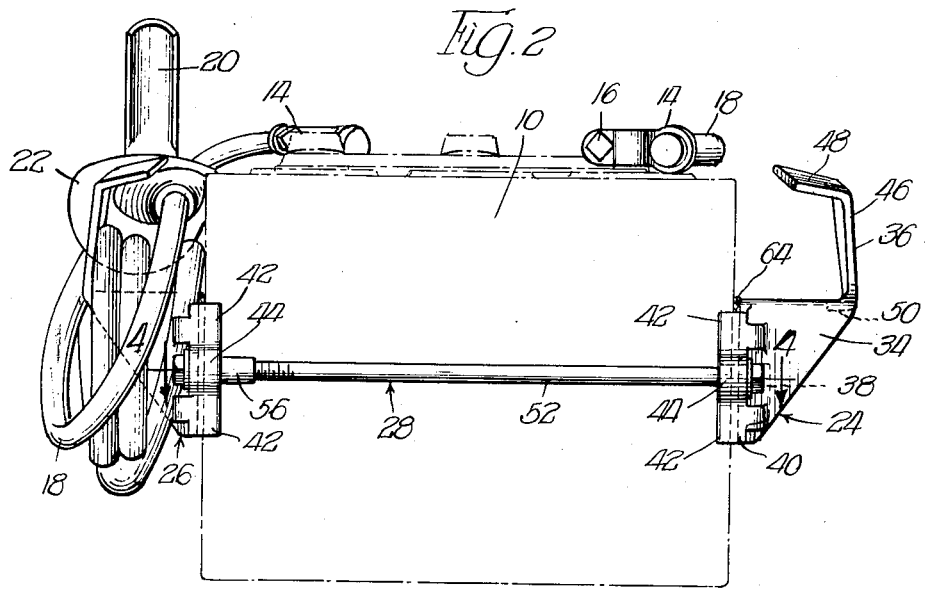
INVENTOR.
Lawrence A. Betz,
BY
Brown, Jackson, Boettcher, & Dienner
Attys.

Sept. 20, 1955        L. A. BETZ        2,718,540
BATTERY AND CABLE CARRIER
Filed July 22, 1952        2 Sheets-Sheet 2
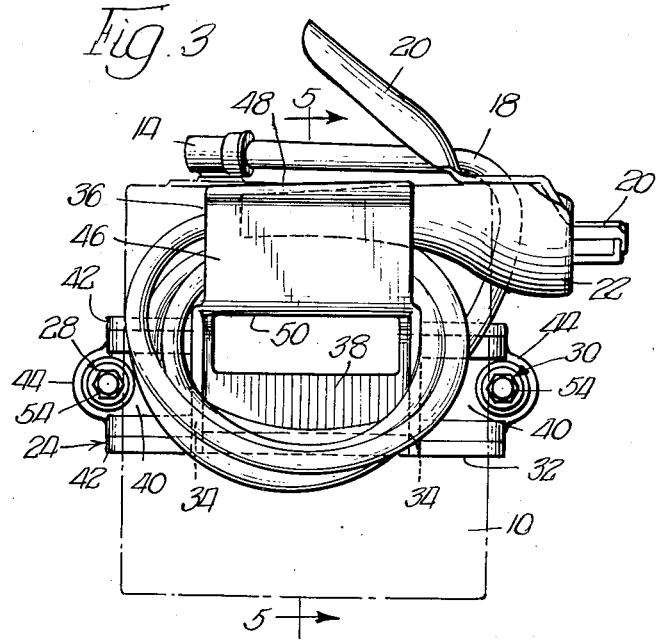
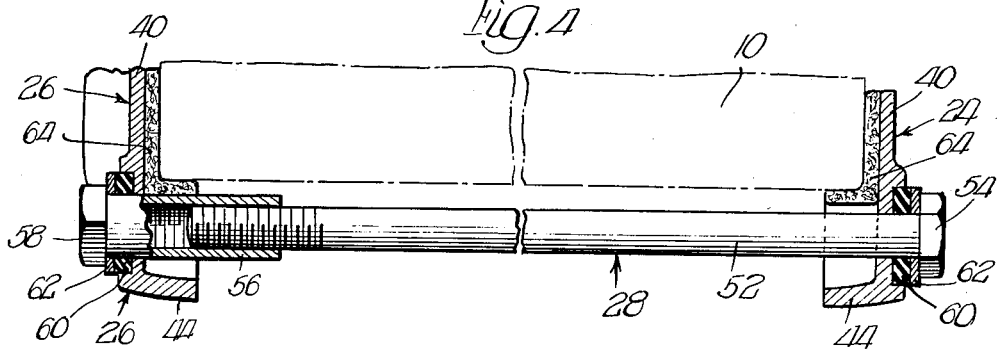
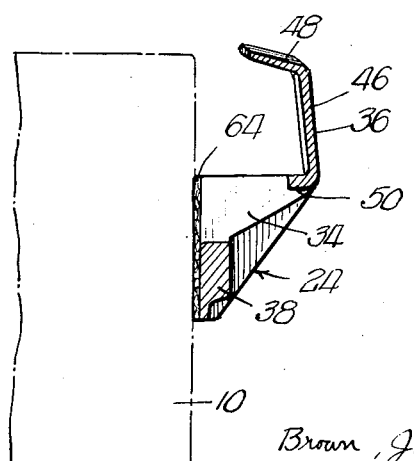
INVENTOR.
Lawrence A. Betz,
BY
Brown, Jackson, Boettcher & Dienner

United States Patent Office 2,718,540
Patented Sept. 20, 1955

2,718,540

BATTERY AND CABLE CARRIER

Lawrence A. Betz, Chicago, Ill.

Application July 22, 1952, Serial No. 300,318

9 Claims. (Cl. 136—171)

The present invention relates to a battery and cable carrier and, particularly, to a framework including a pair of handles whereby a wet cell battery and the cable leads secured to the terminals of the battery may be readily transported from place to place.

Storage batteries employed as portable sources of electrical energy are not provided with handles or any like means for picking up and transporting the batteries. The batteries are heavy and difficult to handle, particularly in view of the fact that if they are tipped or tilted, the liquid in the battery may spill out. In view of these factors, there has been a decided need for a carrier for batteries utilized as a portable source of electrical energy.

Batteries, when used as a portable source of electrical energy, have cables connected to their terminals. The cables are usually rubber sheathed and tend to assume their full length and drag along behind when the battery is being transported, and therefore are difficult to handle. The cables may be stepped upon, resulting in damage, particularly to the clamping jaws at the free end of the cables, and the cables may be jerked loose from the battery terminals. Occasionally, the clamps at the free ends of the cables will contact each other and establish a short circuit.

It is accordingly, a primary object of the present invention to provide carrying means for a battery and its associated cables whereby the battery and also the cables associated therewith may be readily lifted and transported in a safe, compact and convenient manner. With the carrying means of the present invention, the cables need not be disconnected from the battery terminals as a safety precaution, since they are maintained in separated position. Consequently, they together with the battery, are ready for use and transportation at any moment.

According to the present invention, I provide battery carrying and cable retaining means comprising a generally rectangular frame consisting of a pair of end plates and a pair of adjustable side tie members for clamping the end plates to a battery. Each of the end plates includes a handle portion of generally U-shape in cross section within which the cables and their clamps may be positioned and removably secured.

With respect to the handles, it is an object of the present invention to provide improved handles providing for an optimum hand grip and including a portion for locking a coiled cable and its associated clamp about the handle in such position that the cables and clamps do not interfere with gripping of the handles or transportation of the battery.

Another object of the invention is to provide an improved handle for battery carriers and the like wherein a pocket or the like is provided for the reception of a cable and a clamp, the handle being so constructed as to define an entry to the pocket and a portion for locking the cable and clamp in the pocket.

A further object of the present invention is the provision of an improved battery and cable carrier comprising a generally rectangular frame adapted to be secured to a battery to grip the battery at the four corners thereof where the strength of the battery casing is the greatest.

A still further object of the present invention is the provision of an improved battery and cable carrier that is light in weight, economical of manufacture and assembly, readily associated with batteries of various sizes, and capable of being shifted from one battery to another without the necessity of disassembling the carrier.

Other objects and advantages of the present invention will become apparent in the following detailed description of a preferred embodiment of the invention, wherein reference is made to the accompanying drawings, in which:

Figure 1 is a plan view of the carrying means of the present invention as associated with a storage battery which has cables connected to the terminals thereof, the cables being coiled about the cable retaining means or handles of the carrying means;

Figure 2 is a side elevation of the battery and carrying means, one of the cables being omitted to show the structure of the carrying means handles;

Figure 3 is an end elevation of the battery and carrying means;

Figure 4 is a fragmentary horizontal cross sectional view, on an enlarged scale, taken substantially on line 4—4 of Figure 2; and Figure 5 is a fragmentary vertical sectional view taken substantially on line 5—5 of Figure 3.

Referring now to the drawings, I have shown the carrying means of the present invention as associated with a wet cell storage battery 10. As shown, the battery is a three cell battery, but it will be appreciated as the description proceeds that the carrying means of the present invention is capable of use with other types of batteries and batteries having more or less cells. The end cells of the battery have terminals 12 in the form of smooth, tapered studs. Terminal clamps 14 are detachably secured to the terminals 12 by means of bolts 16. Elongate lengths of rubber sheathed cable 18 are secured to the terminal clamps 14 in a usual manner, as by soldering, and terminate at their free ends in pliers-type clamps 20. The handles of the pliers-type clamps 20 are encased in rubber sleeves 22 which insulate the clamps from the hands of the user and also cover and enclose the connection between the cables 18 and the clamps 20.

As will be seen in the drawings, the battery of itself is not provided with any means for carrying or transporting the battery. Accordingly, it must ordinarily be grasped by its bottom edges, which is a difficult and awkward way of carrying as heavy an item as a battery. In addition, there is every possibility of tilting the battery or setting the battery down with too much force which results in spilling of the battery acid or cracking of the battery case. To obviate such disadvantages and to provide for the support and retention of the cables 18 and clamps 20, the present invention provides carrying for the battery provided with handles to facilitate the easy transportation and carrying of the battery and also to provide retainers about which the cables may be coiled and in which the clamps may be removably secured.

The carrying means of the present invention comprises an open framework adapted for the reception of the battery. The frame includes a pair of end plates 24 and 26 and a pair of side ties or tie members 28 and 30 extending between and connecting the end plates 24 and 26 to define a generally rectangular frame. The end plates 24 and 26 are preferably cast metal members and each comprise a base portion 32, a pair of spaced lateral webs 34 and a handle 36 carried by the webs. The base portion 32 of each of the end plates includes a central bar-like portion 38 and plate-like end portions 40, each of which is ribbed for reenforcing the same and is formed at its outer edge with a flange 42 defining a right angle corner at the top and bottom of the plate and an intermediate socket portion 44. The sockets 44 are generally arcuate in form and the base portion 42 is provided at each end with an aperture communicating with the socket. The base portion is of a slightly greater dimension than the width of the battery so that the corner portions of the base 32 are spaced slightly from the corners of the battery in use.

The webs 34 are generally triangular in elevation and project outwardly from the base portion 32 at each end of the central portion 38 thereof. At their outer upper corners, the webs are joined by and support the handle 36, which generally is of the same length as the bar 38 and preferably is approximately 4 inches long. As shown in Figure 5, the handle is generally U-shaped in cross section. In actual design, the bight portion 46 of the U-shaped handle, as viewed in cross section, is disposed generally vertical but is inclined slightly from the vertical and extends inwardly and upwardly with respect to the webs 34. The upper leg or flange portion 48 of the handle, as viewed in cross section or end elevation, is inclined slightly from the horizontal and extends inwardly and upwardly with respect to the bight portion 46 of the handle. The lower leg or flange 50 of the handle is disposed generally horizontally. In plan view, as shown in Figure 1, the upper flange 48 of the handle progressively increases in width from one end thereof to the other to facilitate the coiling and retaining of the battery cable, as will become apparent hereinafter. In addition, the bight or web portion 46 of the handle is inclined inwardly from the narrow end of the flange 48 to the wide end thereof, as is shown in Figures 1 and 2, and the upper flange 48 is inclined upwardly from the narrow end to the wide end thereof, as is shown in Figures 2 and 3. Due to the inclinations of the web and upper flange, the handle provides an optimum hand grip wherein the side of the user's hand opposite the thumb is disposed at the narrow end of the flange 48, the fingers are inserted beneath the lower flange, the palm of the hand intimately embraces the web, and the upper flange is engaged by the heel of the hand to provide full surface engagement for practical, convenient and comfortable gripping.

The end plates 24 and 26 are identical, except that the same are of opposite hand, and the two plates are adapted to be secured or clamped to the opposite ends of the battery by means of the tie members 28 and 30. The tie members 28 and 30 are identical and each comprise an elongate rod or bolt 52 having a head 54 at one end and an external threaded portion at its opposite end, and a nut or female bolt 56 comprising a tube having a head 58 at one end and being internally threaded at its other end for the threaded reception of the rod 52. By providing tie members comprising male and female bolts as described, the frame of the invention is readily adapted for association with batteries of different lengths due to the adjustability of the ties.

As is clearly shown in Figure 4, the rod 52 is passed through the aperture provided at one end of one end plate, 24, and extends through the socket portion thereof. The tubular bolt member 56 is passed through the aperture and socket at the corresponding end of the other end plate, 26, and the two bolt members are adapted to be threaded together to clamp the frame to a battery. Preferably, each socket portion is provided with an exterior recessed portion adapted for the reception of an insulating washer 60 to prevent transmission of electrical energy from end plate to end plate should the exposed portions of the two clamps 20 each engage the handle on which retained. It is also preferred that a metallic washer 62 be inserted between each of the insulating washers 60 and the associated heads 54 and 58 of the bolt or tie members. The end plates 24 and 26 of the carrying frame are of a size to accommodate the width of substantially all wet cell storage batteries and the rods 52 may be selected of a proper length for the battery. For three celled batteries, which may vary slightly in length according to the manufacture thereof, one length of rod 52 will accommodate all such batteries due to the adjustability provided by the nut or female bolt member 56. However, for a four cell battery, a longer rod would be selected, which rod again would be adapted for use with all four cell batteries. In use, the framework is assembled as described with the tie members loosened. The frame may then be slipped onto a battery. Preferably, cushioning members 64, such as sheets of rubber or felt, are disposed between the end plates 24 and 26 and the battery at each corner thereof. Thereafter, the tie members 28 and 30 are tightened to bring the end plates into tight engagement with the end walls of the battery.

In use, the carrier frame grips the battery at the corners thereof where the strength of the battery case is greatest so that any force or impact applied to the battery can be readily absorbed. The handles provide a convenient, comfortable and efficient hand grip whereby the battery may be readily transported from place to place without the danger of tilting the battery and spilling acid therefrom, or setting the battery down with such force as to fracture the case. In addition, the handles comprise means for retaining the cables or leads 18 in coiled condition at each side of the battery and for retaining the clamps 20. In this respect, the cables are led from the terminals of the battery and around the end of the handle at the end thereof presenting the wide portion of the upper flange. The cables are then brought under the handle and over the top thereof to form a coil. As the cables are brought over the top of the handles, the narrow end and inclined edge of the upper handle flange provide an entry portion whereby the cables are led into the space between the inclined edge and the end of the battery and under the upper flange, after which the upper flange will retain the cables in place. The last coil of each cable is drawn tight so that the clamp 20 at the end of the cable, including the insulating sleeve 22, extends beyond the wide portion of the upper flange. Thereafter, the inner end of the sleeve may be inserted beneath the wide portion of the flange wherein the same will be gripped by the handle and the coiled cable to retain the sleeve and clamp in position, as is illustrated in the drawings. As will be apparent, the rubber sheath on the cables and the sleeves 22 will insulate the handles from the battery terminals.

As is clearly shown in Figures 1 to 3, the cables and clamps are retained in such position as not to interfere with the transportation of the battery. The clamps extend from that side of the battery opposite the side the user would stand to pick the battery up so that the hand grips provide optimum carrying capabilities. To remove the carrying means from a battery, it is merely necessary to loosen the tie members, complete disassembly of the frame not being required. In use, the wide end of the upper flange of the handles provides a locking device for retaining the coiled cables and their clamps. Likewise, the handles, in cooperation with the end walls of the battery, each provide a pocket adapted for the reception of the coiled cables and their associated clamps and provide means for locking the cables and clamps in the pocket.

From the foregoing description, it will be apparent that the present invention provides a carrier for a battery and its associated cables which facilitates the handling and carrying of the battery. The battery cables are retained upon the carrier in a convenient and compact manner so as not to interfere with the transportation of the battery. The handles are conveniently positioned so as to render the battery readily transportable without tilting and without subjecting the battery to undue shock. In addition, the handles provide for optimum gripping to provide means for comfortably carrying the battery, and at the same time, constitute a post or retaining means for the coiled cables and their associated clamps.

While I have described what I regard to be a preferred embodiment of my invention, it will be apparent that various changes, rearrangements and modifications may be made therein without departing from the scope of the invention, as defined by the appended claims.

I claim:

1. A battery and cable carrier adapted to receive a battery and the cables connected to the terminals of the battery, comprising a pair of end plates adapted to engage the opposite ends of the battery, a pair of adjustable tie members extending between said end plates at each end thereof adapted to clamp said end plates to the battery, and a handle associated with each of said end plates, each of said handles including a flange portion spaced from the battery engaging portions of the associated end plate adapted to define a pocket between the end wall of the battery and said flange portion, whereby the battery cables may be coiled about said handles and retained in the pockets defined by said handles and the battery.

2. A battery and cable carrier adapted to receive a battery and the cable connected to the terminals of the battery, comprising a pair of end plates adapted to engage the opposite ends of the battery, a pair of tie members extending between said end plates at the opposite ends of said plates, each of said tie members comprising relatively adjustable male and female bolt members, said tie members being adapted to clamp said end plates to the opposite ends of the battery, and combined handle and cable retaining means secured to each of said end plates.

3. A battery and cable carrier adapted to receive a battery and the cables connected to the terminals of the battery, comprising a pair of end plates, and means for securing said end plates to the opposite ends of the battery, each of said end plates comprising a base portion including laterally extending flanges at the opposite ends thereof to define corners adapted for the reception of the corners of the battery to grip the battery at its corners, a pair of spaced webs extending from said base portion in a direction opposite to said flanges and inwardly of said flanges, and a handle connected to and extending between said webs, said handle being of generally U-shape in cross section with the web thereof being disposed generally vertical in spaced relation to the battery engaging portions of said end plate whereby said handle in use defines a pocket between itself and the end wall of the battery adapted for the reception and retention of a battery cable.

4. A battery and cable carrier adapted to receive a battery and the cables connected to the terminals of said battery, comprising a pair of end plates adapted to engage the opposite ends of the battery, and a pair of tie members extending between said end plates, each of said end plates comprising a base portion adapted to engage the battery, a pair of spaced parallel webs secured to said base portion and extending normal thereto, and a handle extending between and connected to said webs at the outer end thereof, said handle being generally U-shape in cross section with the bight portion thereof being disposed generally vertical in spaced relation to the battery engaging portions of said end plate, the upper and lower legs of said handle being disposed generally horizontal and extending from said bight portion toward the end wall of the battery, the upper leg being of increasing width from one end thereof to the other, said handle being adapted to define a pocket between itself and the end wall of the battery whereby a cable may be coiled about said webs and received and retained in the said pocket, the inclined free edge of said upper leg defining an entry for guiding the cable into the said pocket and the wide end thereof comprising a portion for locking the free end of the cable in the pocket.

5. A battery and cable carrier adapted to receive a battery and the cables connected to the terminals of the battery, comprising a pair of end plates adapted to engage the opposite ends of the battery and a pair of adjustable tie members extending between said end plates adapted to clamp said end plates to the battery, each of said end plates comprising a base portion adapted to engage the battery, a pair of spaced parallel webs secured to said base portion and extending normal thereto, and a handle extending between and connected to said webs at the outer end thereof, said handle being generally U-shaped in cross section with the bight portion thereof being disposed generally vertical in spaced relation to the end wall of the battery, the lower leg of said handle being disposed generally horizontal and the upper leg of said handle being inclined inwardly and upwardly with respect to said webs in spaced relation thereto, said upper leg being of increasing width from one end thereof to the other and being inclined upwardly from the narrow end to the wide end thereof, said bight portion being inclined inwardly and upwardly with respect to said lower leg and being inclined inwardly from the narrow end to the wide end of said upper leg, said handle being adapted to define a pocket between itself and the end wall of the battery whereby a cable may be coiled about said webs and received and retained in said pocket, the inclined free edge of said upper leg defining an entry for guiding the cable into said pocket and the wide end thereof comprising a portion for locking the free end of the cable in the pocket.

6. A battery and cable carrier adapted to receive a battery, the cables connected to the terminals of the battery and the clamps connected to the free ends of the cables, comprising means adapted to receive the battery, said means including a pair of handles adapted to be disposed at the opposite ends of the battery, each of said handles being generally U-shaped in cross section with the web thereof being disposed generally vertical in spaced relation to the end wall of the battery, the lower leg being disposed generally horizontal and the upper leg being inclined inwardly and upwardly with respect to the web, said upper leg being of increasing width from one end thereof to the other and being inclined upwardly from the narrow end to the wide end thereof, said web being inclined inwardly and upwardly with respect to said lower leg and being inclined inwardly from the narrow end to the wide end of said upper leg, said handle being adapted to define a pocket between itself and the end wall of the battery whereby a cable may be coiled about said handle to receive and retain the cable in said pocket, the inclined free edge of said upper leg defining an entry for guiding the cable into said pocket and the wide end thereof comprising a portion beneath which the clamp at the free end of the cable may be inserted for locking the clamp and the free end of the cable in the pocket.

7. A battery and cable carrier adapted to receive a battery and the cables connected to the terminals of the battery, comprising a pair of end plates adapted to engage the opposite ends of the battery, a pair of tie members extending between said end plates at the opposite ends of said plates for clamping said end plates to the battery, each of said tie members comprising relatively adjustable male and female bolt members, and an insulating washer disposed between each of said bolt members and the respective end plates through which they extend, each of said end plates comprising a base portion adapted to engage the battery and a handle secured to said base portion, said handle being generally U-shaped in cross section with the web thereof being disposed generally vertical and in spaced relation to said base portion, the legs of said handle being disposed generally horizontal, said handle being adapted to define a pocket between itself and the end wall of the battery whereby a cable may be coiled about said handle and received and retained in said pocket.

8. A battery and cable carrier adapted to receive a battery, the cables connected to the terminals of the battery and the clamps connected to the free end of the cables, comprising a pair of end plates adapted to engage the opposite ends of the battery, a pair of tie members extending between said end plates at the opposite ends of said plates, each of said tie members comprising relatively adjustable male and female bolt members, said tie members being adapted to clamp said end plates to the opposite ends of the battery, said end plates each including a base portion having laterally extending flanges at the opposite ends thereof to define corners adapted for the reception of the corners of the battery to grip the battery at its corners, a pair of spaced parallel webs secured to said base portion and extending normal thereto in a direction opposite the direction of said flanges, and a handle extending between and connected to said webs at the outer end thereof, said handles being generally U-shaped in cross section with the bight portion thereof being disposed generally vertical and extending above said base portion in spaced relation outwardly of said base portion, the lower leg of said handle being disposed generally horizontal, the upper leg of said handle being inclined inwardly and upwardly with respect to the bight portion and being adapted to be disposed adjacent the top of the battery, said upper leg being of increasing width from one end thereof to the other and being inclined upwardly from the narrow end to the wide end thereof, said bight portion being inclined inwardly and upwardly with respect to said lower leg and being inclined inwardly from the narrow end to the wide end of said upper leg, said handle being adapted to define a pocket between itself and the end wall of the battery whereby a cable may be coiled about said webs and received and retained in said pocket, the inclined free edge of said upper leg defining an entry for guiding the cable into the said pocket and the wide end thereof comprising a portion beneath which the clamp at the free end of the cable may be inserted for locking the clamp and the free end of the cable in the pocket.

9. The carrier of claim 8 wherein each end plate comprises a unitary metallic casting including said base portion, said flanges, said webs and said handle.

References Cited in the file of this patent

UNITED STATES PATENTS 2,610,987    Betz _____ Sept. 16, 1952

FOREIGN PATENTS 299,469    Italy _____ Aug. 3, 1932